United States Patent
Klein

(10) Patent No.: US 9,167,056 B2
(45) Date of Patent: *Oct. 20, 2015

(54) IN-HOUSE LOCATION BASED SERVICES

(71) Applicant: Broadcom Corporation, Irvine, CA (US)

(72) Inventor: Philippe Klein, Jerusalem (IL)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,356

(22) Filed: Sep. 16, 2013

(65) Prior Publication Data
US 2014/0012902 A1    Jan. 9, 2014

Related U.S. Application Data

(63) Continuation of application No. 13/074,839, filed on Mar. 29, 2011, now Pat. No. 8,537,753.

(60) Provisional application No. 61/454,782, filed on Mar. 21, 2011.

(51) Int. Cl.
| | |
|---|---|
| H04W 4/00 | (2009.01) |
| H04L 29/06 | (2006.01) |
| H04L 12/28 | (2006.01) |
| H04W 4/04 | (2009.01) |
| H04L 29/08 | (2006.01) |

(52) U.S. Cl.
CPC .............. *H04L 67/42* (2013.01); *H04L 12/282* (2013.01); *H04L 65/1026* (2013.01); *H04L 65/4084* (2013.01); *H04L 67/18* (2013.01); *H04W 4/043* (2013.01)

(58) Field of Classification Search
USPC ........................................................ 370/328
See application file for complete search history.

(56) References Cited

U.S. PATENT DOCUMENTS

| | | | |
|---|---|---|---|
| 8,537,753 B2 * | 9/2013 | Klein ............................ | 370/328 |
| 2007/0143687 A1 | 6/2007 | Choi et al. | |
| 2007/0244633 A1 | 10/2007 | Phillips et al. | |
| 2009/0275348 A1 | 11/2009 | Weinreich et al. | |
| 2010/0058398 A1 | 3/2010 | Ojala et al. | |

FOREIGN PATENT DOCUMENTS

| | | |
|---|---|---|
| CN | 101589629 A | 11/2009 |
| WO | 2004081713 A2 | 9/2004 |
| WO | 2004081713 A3 | 9/2004 |

OTHER PUBLICATIONS

European Search Report in co-pending EP Application No. 12001071.5, mailed Jul. 5, 2012.
Office Action for Chinese Patent Application No. 2012100492702, mailed May 22, 2015 (including English summary).
Office Action for Chinese Patent Application No. 201210049270.2 dated Apr. 8, 2014 (including English summary).
Office Action for Chinese Patent Application No. 201210049270.2 mailed Nov. 3, 2014 (including English summary).

* cited by examiner

*Primary Examiner* — Dang Ton
*Assistant Examiner* — Pamit Kaur
(74) *Attorney, Agent, or Firm* — Foley & Lardner LLP; Christopher J. McKenna; Paul M. H. Pua

(57) ABSTRACT

A mobile device of a user discovers topological information about electronic devices in a premise environment, and shares such information with a media gateway. The media gateway uses the topological information to augment content from a server, such as a web page that supports access to media content, to add graphical objects corresponding to those electronic devices in proximity to the mobile device that are capable of reproducing the streaming media content. Selection of the one of the add-on graphical objects causes delivery of the media content to the corresponding electronic device instead of the display of the mobile device. In this manner, a more natural selection mechanism than that available using conventional pull-down lists of options is provided.

20 Claims, 12 Drawing Sheets

IN-HOUSE LOCATION BASED SERVICES

RELATED APPLICATIONS

This application is a continuation of U.S. patent application Ser. No. 13/074,839, filed Mar. 29, 2011, which makes reference to, claims priority to, and claims benefit of U.S. Provisional Patent Application Ser. No. 61/454,782, filed Mar. 21, 2011, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A home network is typically a heterogeneous network composed of multiple wired and wireless technologies, where each individual device is handled as a single physical entity. Such an arrangement generally does not offer seamless interconnectivity between the fixed, nomadic, and mobile devices in the home.

The interconnection between devices (and appliances) is partially addressed by technology such as that being developed by the members of the Digital Living Network Alliance (DLNA). The most recently published "DLNA Interoperability Guidelines—version 1.5" first available in March, 2006, provides information about interconnecting devices. Additional information about the work of the DLNA and the latest version of the "DLNA Interoperability Guidelines" may be found at "http://www.dlna.org".

The DLNA Interoperability Guidelines do not, however, address the issues of graphical user interface (GUI) complexity. For example, simply presenting a listing all of the devices present in the home in multi-level scroll down menu to allow a user to select one device may be a graphical user interface that is too cumbersome for the vast majority of users to find acceptable, and may act as a barrier to the broad acceptance of home services based on interconnected devices.

Currently topological mapping is done by integrators on a "smart remote control tablet" or "smart phone" in a fully-customized or semi-customized way. Such mappings are limited to static mappings, however. Additional details of software applications supporting such static mapping for the Apple iPad and iPhone are available from Connecting Technology, <http://www.connecting-technology.com>.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention relates to devices, methods, and systems supporting natural user selection of nearby electronic devices for reproduction of media content, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate in general to simplifying user control over playback of media content. More specifically, aspects of the present invention relate to augmenting the graphical user interface of a legacy web page based on discovery of the availability of playback devices in proximity to a mobile device of a user, to provide a straightforward and natural means of selecting an alternate electronic device on which media content may be reproduced.

Although the following discussion makes frequent reference to a user mobile device as a mobile or handheld device, a cellular phone, a personal digital assistant, or one a variety of types of personal computer such as, for example, a handheld, tablet, notebook, netbook, or laptop, the inventive concepts presented herein are not specifically limited only to use with those devices, and may find application in other electronic devices known now or in the future.

The term "stream" is used herein in relation to the communication of moving image (e.g., video) or audio information. This term is used without specific limitation of the inventive concepts described herein, as the digital information communicated may represent still images each of which is transmitted as certain amount of information, and not as a continuous stream of digital content, as might be the case in the communication of video and audio streams.

The term "media content" is used herein to refer to still image, motion video, audio, text, and graphical image information.

The term "premise environment" is used herein to refer to the usable physical space considered to be part of a residence, small office, or business.

The term "topological information" is used herein to refer to information that represents, for example, the identities, physical arrangement, communicative coupling (i.e., connectivity), and capabilities of electronic devices capable of wireless communication in a premise environment.

The term "wireless communication circuitry" is used herein to refer to elements of an electronic device that permit wireless communication with one or more similar devices, devices of other types, or elements of a communication infrastructure such as, for example, wireless base stations, access points, and terminals of wireless wide area, local area, personal area, and near-field networks.

It should be noted that although this disclosure describes the use of wireless communication according to wireless technologies complying with, for example, the Institute of Electrical and Electronic Engineers (IEEE) 802.11a/b/g/n, TGac, and/or s recommendations, the BLUETOOTH® communication protocol, the Zigbee® communication protocol, and the specifications of the Near Field Communication (NFC) Forum, the use of these wireless communications technologies do not represent a specific limitation of the present invention, as the techniques describes herein may be practiced using wireless communications technologies other than those mentioned herein.

Figure 1:
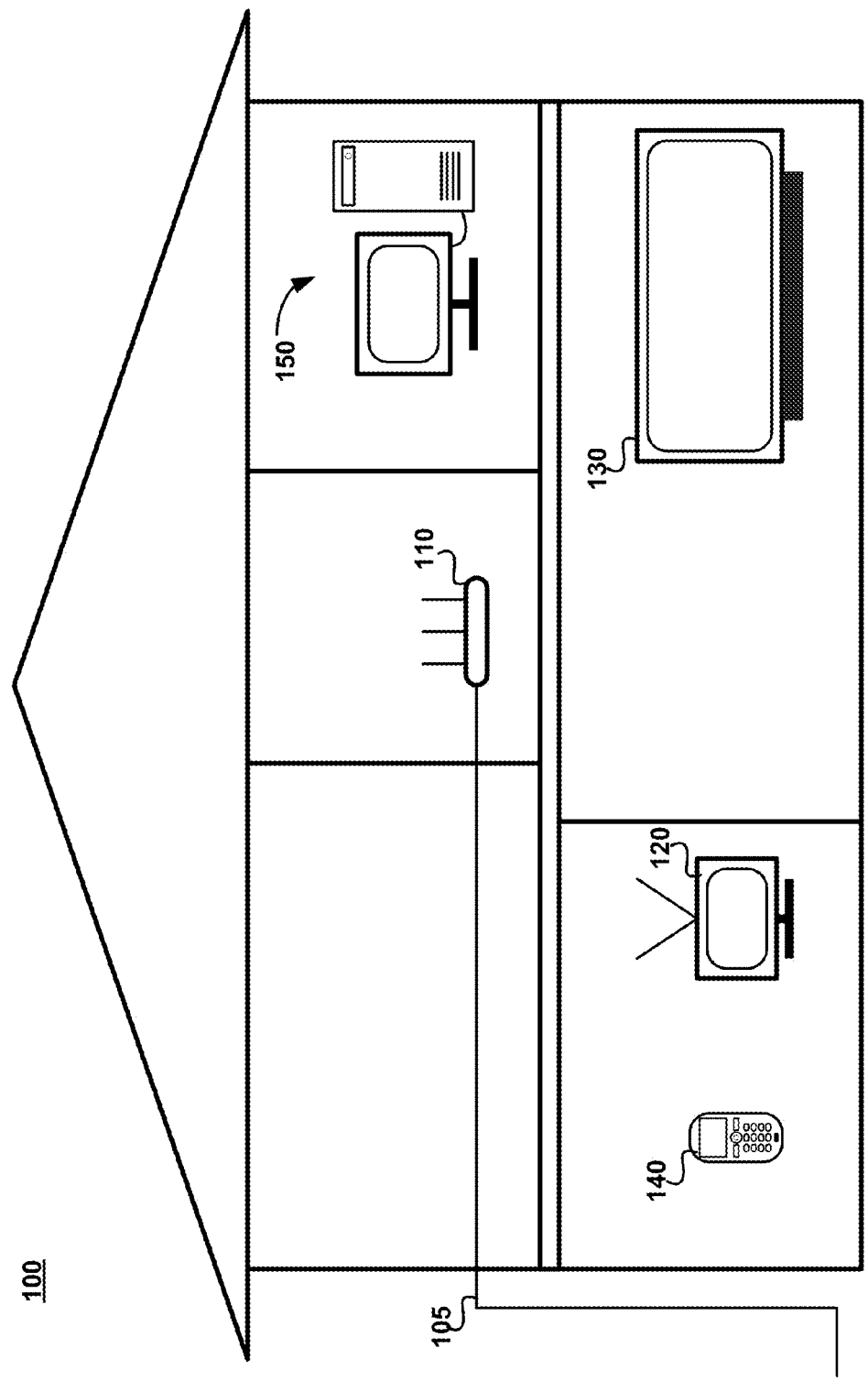
FIG. 1 illustrates a premise environment having a number of electronic devices that may be elements of a network in which a representative embodiment of the present invention may be practiced.

FIG. 1 illustrates a premise environment 100 having a number of electronic devices that may be elements of a network in which a representative embodiment of the present invention may be practiced. A premise environment may be, for example, a private residence, a business office, or any other location having a electronic devices capable of being networked. The premise environment 100 illustrated in FIG. 1 includes a wireless access point (WAP) 110, a first television 120, a second television 130, a user mobile device 140, and a personal computer 150. The electronic devices shown in FIG. 1 are for purposes of illustration only, and are not intended to represent specific limitations of the present invention. The wireless access point 110 may provide wireless local area network access for the electronic devices in and around the premises environment 100 to a wired or wireless local or wide area network 105 such as, for example, a digital subscriber line network, a cable television network, a satellite network, a wireless IEEE 802.16 (WiMax) network, or other suitable network.

Each of the first television 120, the second television 130, the user mobile device 140, and the personal computer 150 may be equipped to communicate with the wireless access point 110 using wireless communication circuitry compliant with an IEEE 802.11a, b, g, n, TGac, and/or s, BLUETOOTH®, Zigbee® (IEEE 802.15.4), Near Field Communication (NFC), infra-red (IR), or other suitable present or future wireless communication technology. In addition, the electronic devices shown in FIG. 1 may be equipped with additional wireless communication circuitry to communicate with each other using, for example, any of the IEEE 802.11a, b, g, n, TGac, or s, BLUETOOTH®, Zigbee® (IEEE 802.15.4), Near Field Communication (NFC), infra-red (IR), or other suitable present or future wireless communication technologies.

Figure 2:
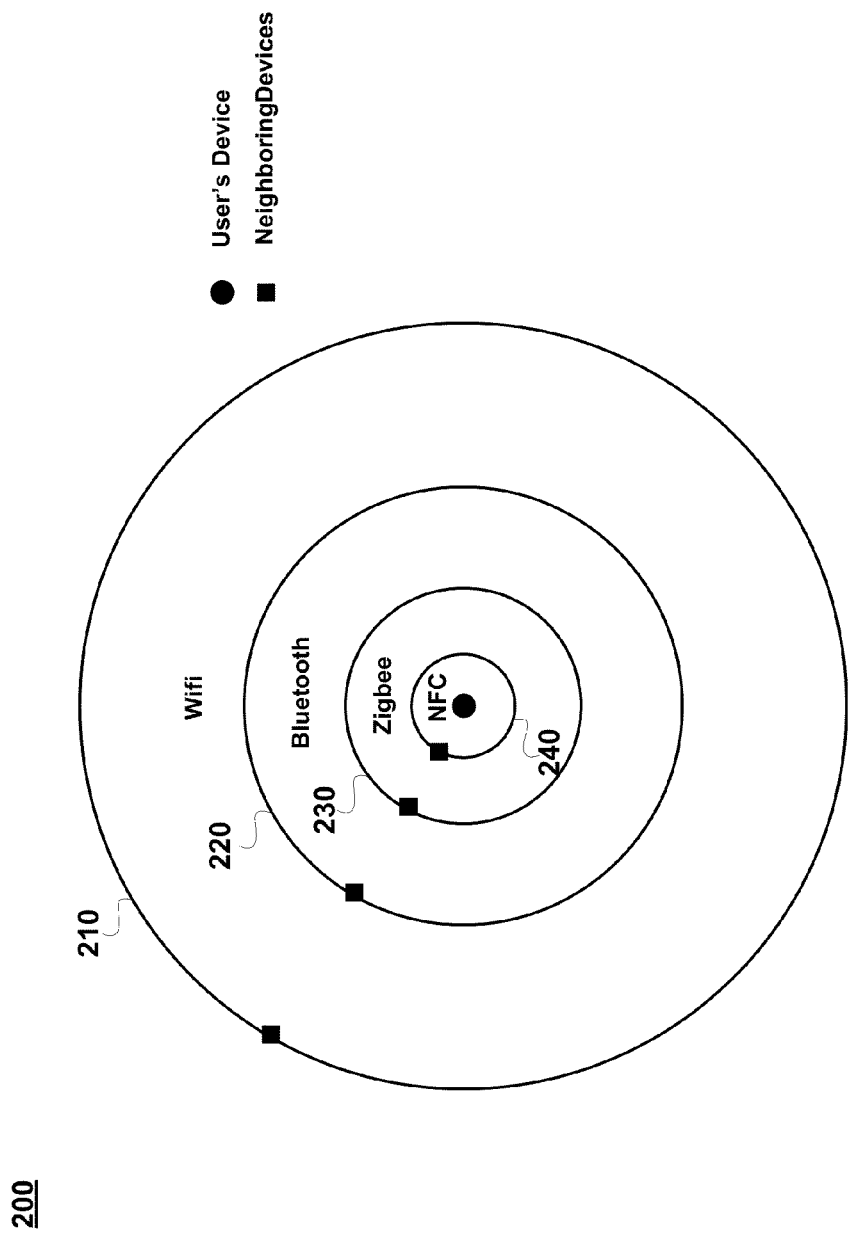
FIG. 2 illustrates the relative coverage areas/operating ranges of a number of different wireless communication technologies presently in use for data communication in electronic devices found in residential, small office, and business environments.

FIG. 2 illustrates the relative coverage areas/operating ranges of a number of different wireless communication technologies presently in use for data communication in electronic devices found in residential, small office, and business environments. Such communication technologies include, for example, the Institute of Electrical and Electronics Engineers (IEEE) 802.11a, b, g, n, TGac, and s (aka Wi-Fi) standards, the BLUETOOTH® standard, Zigbee (IEEE 802.15.4), and Near Field Communication (NFC) Forum Specification, which may be employed in a representative embodiment of the present invention.

The examples of wireless communication technologies illustrated in FIG. 2 differ in many ways including, for example, data transmission rates, types of modulation used, and transmitted signal power. The radius of coverage of equipment employing the IEEE 802.11b and g standards using an omni-directional antenna, for example, shown in FIG. 2 as the outer-most circular boundary 210, is estimated at between 150-300 feet, with IEEE 802.11a normally providing about one third of that range, and IEEE 802.11n providing a greater operating range than that of IEEE 802.11b/g.

The operating range for BLUETOOTH®, illustrated in FIG. 2 by the circular boundary 220, is normally stated as being between 6 and 250 meters (between approximately 20 and 830 feet), depending upon the transmit power level, transmission path characteristics, and receiver sensitivity. Transmit power level for radios operating according to the BLUETOOTH® Specification is classified as Class 1 (100 mw), Class 2 (2.5 mw), or Class 3 (1 mw), respectively.

The operating range for Zigbee® (IEEE 802.15.4), illustrated by the circular boundary 230 in FIG. 2, is generally considered to be similar to that of IEEE 802.11, but Zigbee® operates at considerably lower transmit power levels and bit rates that IEEE 802.11.

The operating range of near-field communication (NFC), illustrated by the circular boundary 240 in FIG. 2, is extremely limited and offers a useful range of only a few tens of centimeters.

In a representative embodiment of the present invention, dynamic and self-learning mapping may be automated by extracting topological information from correlated signal information (e.g., channel estimation, signal-to-noise ratio (SNR), Time Synchronization . . . ) provided by any of a number of wireless technologies whenever available such as, for example, IEEE802.11 (aka Wi-Fi), BLUETOOTH®, IEEE 802.15.4 (Zigbee®), and near-field communication (NFC), as illustrated in FIG. 2.

These communication technologies may be used alone or in combination to aid in locating a device within a room, residence, or business, and to convey the identity and capabilities of electronic devices such as those of FIG. 1, for example.

The actual wireless technology used in a representative embodiment of the present invention to locate an electronic device within the premise may be any combination of technologies selected from a variety of different known approaches, and does not represent a specific limitation of the present invention. The details of location using such wireless communication technologies will not be described in detail here.

Presently, electronic devices such as those typically found in the home, small office, and business environment nowadays are generally handled as a single physical entity, although as will be shown below, these physical devices could be dynamically linked as virtual multimodal devices delivering content and manageability through multimodal means, for example, by selecting a stream on a mobile device but then displaying the stream on a nearby television (TV) set in the native resolution of the TV screen. To provide what may be referred to as a "natural graphical user interface (GUI)", where "natural" is given the same meaning as in "natural language," the electronic devices may be made aware of their topological locations within a home/small office/business environment, in order to offer a nomadic/mobile user an easy way to use the services of the electronic devices immediately available in his/her current environment.

As an illustrative but non-limiting example, in a first scenario, a person may enter the family room of a home with her cellular phone and may wish to share a video clip (e.g., from YouTube®) with those present, on a television set in the family room. In a representative embodiment of the present invention, a GUI shown on the display of the cellular phone may offer the option to direct the video clip to the television set in the family room, instead of forcing the user to display the clip on the small screen of her cellular phone, or scroll down a menu listing all the display devices connected in the home.

As another illustrative but non-limiting example, in a second scenario, a person may browse the Web using his/her own electronic device. In a representative embodiment of the present invention, the displayed Web pages may be simultaneously displayed on a television screen in the room in which they are located. The person may use his/her portable electronic device to display an electronic "TV Guide," and send commands to the television set.

As yet another illustrative but non-limiting example, in a third scenario, a person may start playing a game on a television set while in the living room of a home, using a wireless handheld device. In a representative embodiment of the present invention, the user may then move to a second display device, for example, a television in another room of the home, while seamlessly continuing to play the game on the display device in the second room.

Figure 3:
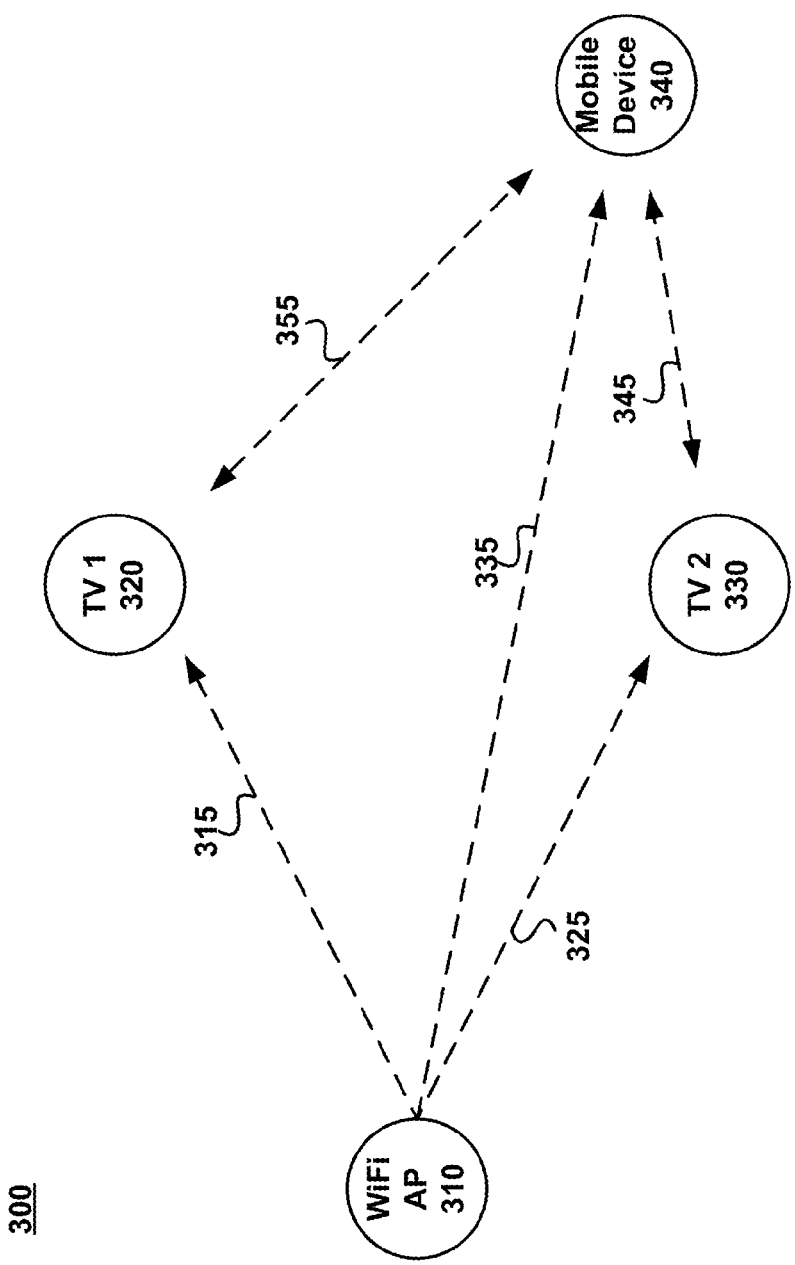
FIG. 3 illustrates an arrangement of an IEEE 802.11 (i.e., Wi-Fi) access point (AP), a first television TV1, a second television TV2, and a user mobile device such as, for example, a cellular phone, a smart phone, a handheld personal computer, or other nomadic/mobile device, in a home, small office, or business environment in which the user mobile device wirelessly discriminates between the first television set TV1 and the second television set TV2 within a similar range from a IEEE 802.11 (Wi-Fi) access point (AP) using the wireless communication capabilities of the user mobile device, the IEEE 802.11 AP, and the televisions TV1 and TV2 such as, for example, a BLUETOOTH® compatible radio frequency interfaces and IEEE 802.11 radio frequency interfaces, in accordance with a representative embodiment of the present invention.

FIG. 3 illustrates an arrangement of an IEEE 802.11 (i.e., Wi-Fi) access point (AP) 310, a first television TV1 320, a second television TV2 330, and a user mobile device 340 such as, for example, a cellular phone, a smart phone, a handheld personal computer, or other nomadic/mobile device, in a home, small office, or business environment in which the user mobile device 340 wirelessly discriminates between the first television set TV1 320 and the second television set TV2 330 within a similar range from a IEEE 802.11 (Wi-Fi) access point (AP) 310 using the wireless communication capabilities of the user mobile device 340, the IEEE 802.11 AP 310, and the televisions TV1 320 and TV2 330 such as, for example, a BLUETOOTH® compatible radio frequency interfaces and IEEE 802.11 radio frequency interfaces, in accordance with a representative embodiment of the present invention.

As illustrated in FIG. 3, the Wi-Fi AP 310 may be equipped to communicate with the TV1 320 and TV2 330 over IEEE 802.11 compliant wireless radio frequency communication paths 315 and 225, respectively. The user mobile device 340 may also communicate with the Wi-Fi AP 310 over IEEE 802.11 compliant wireless RF communication path 335. In addition, the televisions TV1 320 and TV2 330 may be equipped to communicate with the user mobile device 340 using a wireless communication protocol such as, for example, that described by the BLUETOOTH® Specification, over wireless communication paths 355 and 345, respectively.

Although this discussion of FIG. 3 describes the use of radio frequency signals compliant with the IEEE 802.11 standard and the BLUETOOTH® Specification, these aspects of the illustrative example of FIG. 3 are not specific limitations of the present invention, as any suitable technique for locating nearby electronic devices capable of receiving, processing, and reproducing information content may be employed by the user mobile device 340, and other electronic devices like the televisions TV1 320 and TV2 330, and AP 310, in a representative embodiment of the present invention.

In the example of FIG. 3, the televisions TV1 320 and TV2 330 may be equipped to receive and display media content such as, for example, a still image, motion video, web pages, and other digital information communicated via the AP 310 over wireless communication paths 315 and 325, respectively. The user mobile device 340 may be similarly capable of receiving and displaying media content such as, for example, still images, motion video, web pages, and other digital information communicated by the AP 310. In some representative embodiments, the user mobile device 340 may employ additional wireless communication paths in receiving media content for display/playback.

In a representative embodiment of the present invention, the user mobile device 340 may be equipped to use wireless signals communicated by the Wi-Fi AP 310, the TV1 320, the TV2 330, and/or other electronic devices in the vicinity of the location of the user mobile device 340 to learn of the presence and capabilities of those other electronic devices. The user mobile device 340 may use information communicated on or characteristics of the signals communicated from one electronic device to another to ascertain the geographic location and/or the topology of the user mobile device 340 and the electronic devices in the vicinity of the user mobile device 340. For example, this may be done using receive signal strength information measured by the receivers in electronic devices such as the AP 310, TV1 320, TV2 330, and the user mobile device 340. Other characteristics of wireless signals may also be employed, alone or in combination with receive signal strength.

The user mobile device 340 of a representative embodiment of the present invention may also learn the identities and capabilities of the electronic devices accessible to the user mobile device 340, and any electronic devices in the vicinity of the user mobile device 340 may learn of the identity and capabilities of the user mobile device 340. Illustrative but non-limiting examples of capabilities of the electronic devices of FIG. 3 include the ability to generate, store, play back and/or reproduce one or more streams of video and/or audio information, and the ability to generate, store, display and/or reproduce still pictures, to name only a few examples.

In a representative embodiment of the present invention, an electronic device such as the user mobile device 340 may enter a residential, small office, or business environment such as the premise environment 100 of FIG. 1. The user mobile device 340 may discover one or more electronic devices within proximity of the user mobile device, such as, for example, one or both of televisions TV1 320 and TV2 330 of FIG. 3, and may receive identity and capability information from TV1 320, TV2 330, and AP 310. Although radio frequency communication paths 335, 345, and 355 are shown in illustration of FIG. 3, one or more of those possible communication paths may not meet criteria set by a manufacturer and/or a user of the user mobile device 340 used to place the respective electronic devices (i.e., AP 310, TV2 330, and TV1 320) within a certain distance or proximity range to the user mobile device 340, making those electronic devices accessible or available to the user mobile device 340.

In a representative embodiment of the present invention, information about the discovered electronic device(s) in a premise environment, along with identity and capability information, may be used to create a collection or database of topological information. In some representative embodiments, the topological information, including identity and capability information gathered in this manner, is then stored in memory of the user mobile device 340. The information stored may be selected or categorized based upon the manufacturer/user defined criteria used to classify target electronic devices as accessible or available. In other representative embodiments, the topological information, including the gathered identity and capability information, may be stored in memory of electronic devices within the premise environment other than, or in addition to, the user mobile device 340, and/or in memory of electronic devices external to the premise environment, as will be explained further, below.

Although the user mobile device 340 may be equipped with circuitry to communicate with electronic devices in the surrounding environment using one or more wireless communication technologies, it may be necessary for the user of the user mobile device 340 to aid in solving any initial indetermination in locating the user mobile device 340 within the premise environment, by providing answers to a few questions presented by a simple wizard-type application on the user mobile device 340. For example, referring now to FIG. 1, the user mobile device 140 may discover that the first television 120 and the second television 130 meet criteria for making them both accessible to the user mobile device 140. A user may wish to identify or "map" the whereabouts within the premise environment 100 of each accessible electronic device, to enable a user of the user mobile device 140 to later unambiguously select one of the first and second televisions 120, 130, for example.

As an illustrative but non-limiting example, the first time an "unmapped" television set is discovered by a nomadic/mobile electronic device such as, for example, the user mobile device 340 of FIG. 3, a user of the electronic device may be prompted to identify the room in which the discovered television set is located, using a simple GUI. The electronic device (e.g., user mobile device 340) may then transmit the location provided by the user, to the discovered television. Once the discovered television knows its location, the television is then able to advertise or share its location with other electronic devices such as, for example, the mobile phone 340, during discovery. Over time, as more and more electronic devices and appliances in the home/small office/business environment are discovered and mapped, the localization of a nomadic/mobile electronic device may be made more precise, by the nomadic/electronic device ranging against the known location(s) of the static electronic devices and appliances within the home/small office/business environment.

In a representative embodiment of the present invention, the topological information, including identity an capability information, gathered during the discovery and mapping of the static electronic devices and appliances by a nomadic/mobile electronic device may be used to provide a user interface to replace cumbersome legacy menu schemes now in use, by providing a mechanism to, for example, automatically augment a displayed Web page, "on the fly" using, for example, a home/small office/business web server proxy or media gateway to include topological options in displayed content.

Figure 4A:
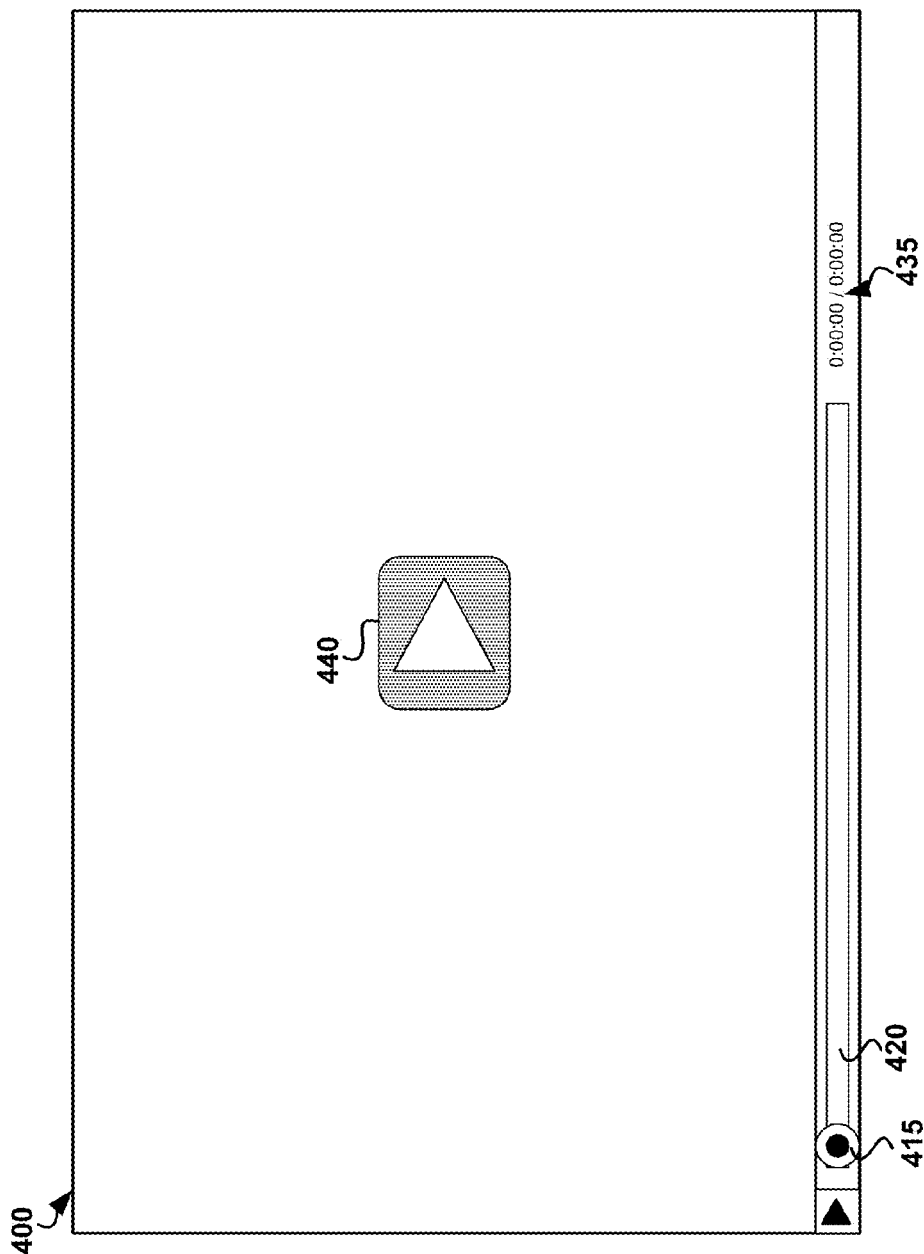
FIG. 4A is an illustration of a window of a graphical user interface (GUI) that may appear, for example, as part of a web page on the display of a user mobile device, where the window is provided when viewing media content in the form of motion video, according to the prior art.

FIG. 4A is an illustration of a window 400 of a graphical user interface (GUI) that may appear, for example, as part of a web page on the display of a user mobile device, where the window 400 is provided when viewing media content in the form of motion video, according to the prior art. Such a graphical user interface may be used for viewing files of motion video encoded according to an encoding methodology of the Motion Picture Experts Group (MPEG), for example. The window 400 includes a progress bar 420 representing the entirety of the motion video file, and an indicator 415 to show the relative position within the displayed file of the currently displayed image. An actual indication of the current elapsed time and the total duration of the motion video file is shown as elapsed and total time indicator 435. A graphical icon 440 is displayed to enable the viewer to start the viewing of the motion video file on the display of the user mobile device by simply selecting the graphical icon 440. During viewing, the position of the indicator 415 along the progress bar 420 represents relative progress in playback of the motion video file.

Figure 4B:
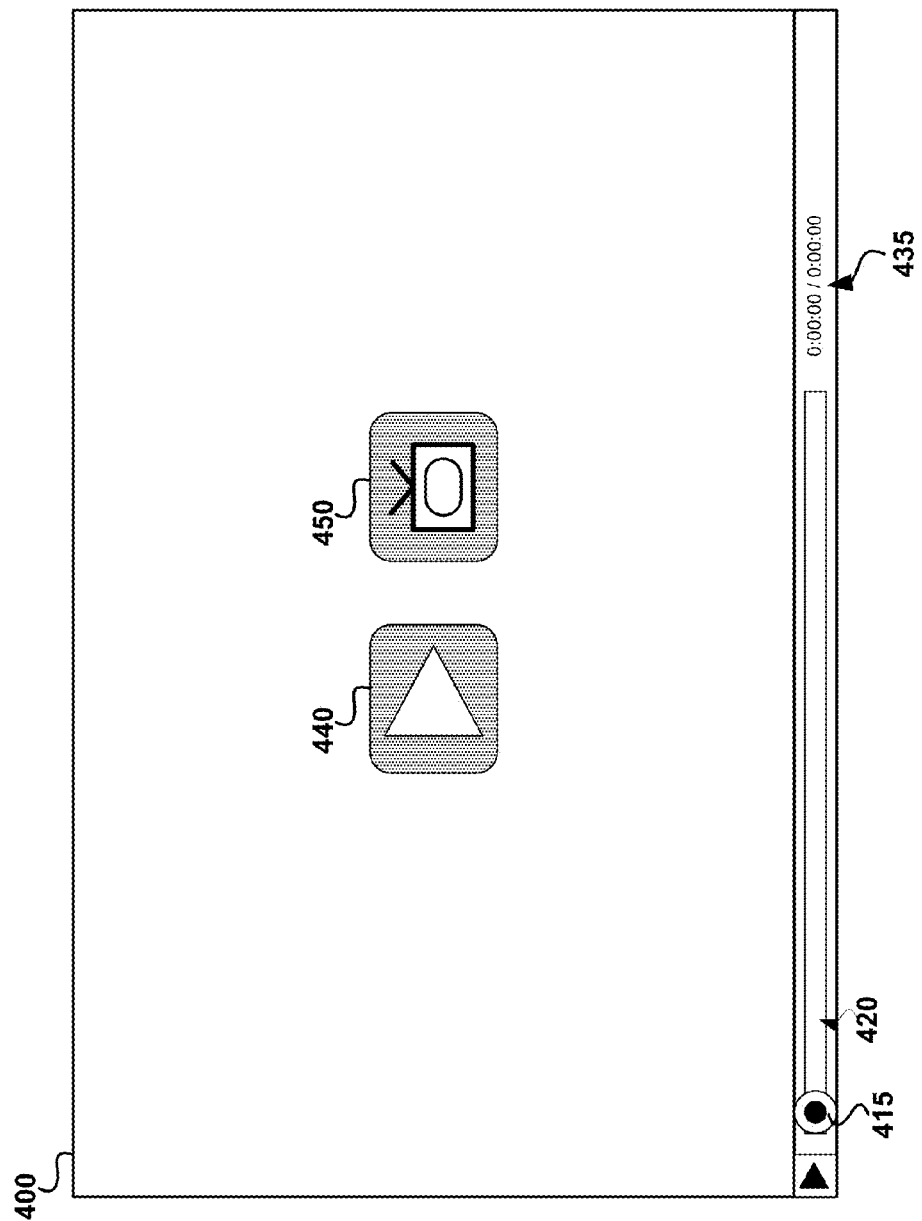
FIG. 4B is an illustration of a window of an exemplary graphical user interface that may appear, for example, as part of a web page on the display of a user mobile device such as, for example, the user mobile device of FIG. 3, in which the displayed window has been augmented with a graphical icon, in accordance with a representative embodiment of the present invention.

FIG. 4B is an illustration of a window 400 of an exemplary graphical user interface that may appear, for example, as part of a web page on the display of a user mobile device such as, for example, the user mobile device 340 of FIG. 3, in which the displayed window 400 has been augmented with a graphical icon 450, in accordance with a representative embodiment of the present invention. The graphical icon 450 shown as part of window 400 enables a user to direct media content accessed by the user of the user mobile device 340, for example, for playback or reproduction on a suitable electronic device in proximity to the user mobile device 340. The graphical icon 450 is displayed to the user of the user mobile device 340, for example, based upon a determination that an electronic device in the proximity of the user mobile device 340 is a suitable electronic device for display/playback/reproduction of the media content accessed by the user of the user mobile device 340. Such a determination uses the topological information created during discovery by the user mobile device 340 of the electronic devices in proximity to and accessible by the user mobile device 340. Although FIG. 4B shows only one icon (i.e., icon 450) representing a single suitable electronic device for display/playback/reproduction of media content accessed by the user mobile device 340, this does not represent a specific limitation of a representative embodiment of the present invention. In a representative embodiment of the present invention, a user mobile device such as the user mobile device 340, for example, may display a graphical icon such as, e.g., the icon 450 of FIG. 4B, for a number of suitable electronic device accessible to the user mobile device 340, to enable a user of the user mobile device 340 to select which of the accessible electronic devices in proximity to the user mobile device 340 is to receive the media content accessed by the user of the user mobile device 340.

Figure 5A:
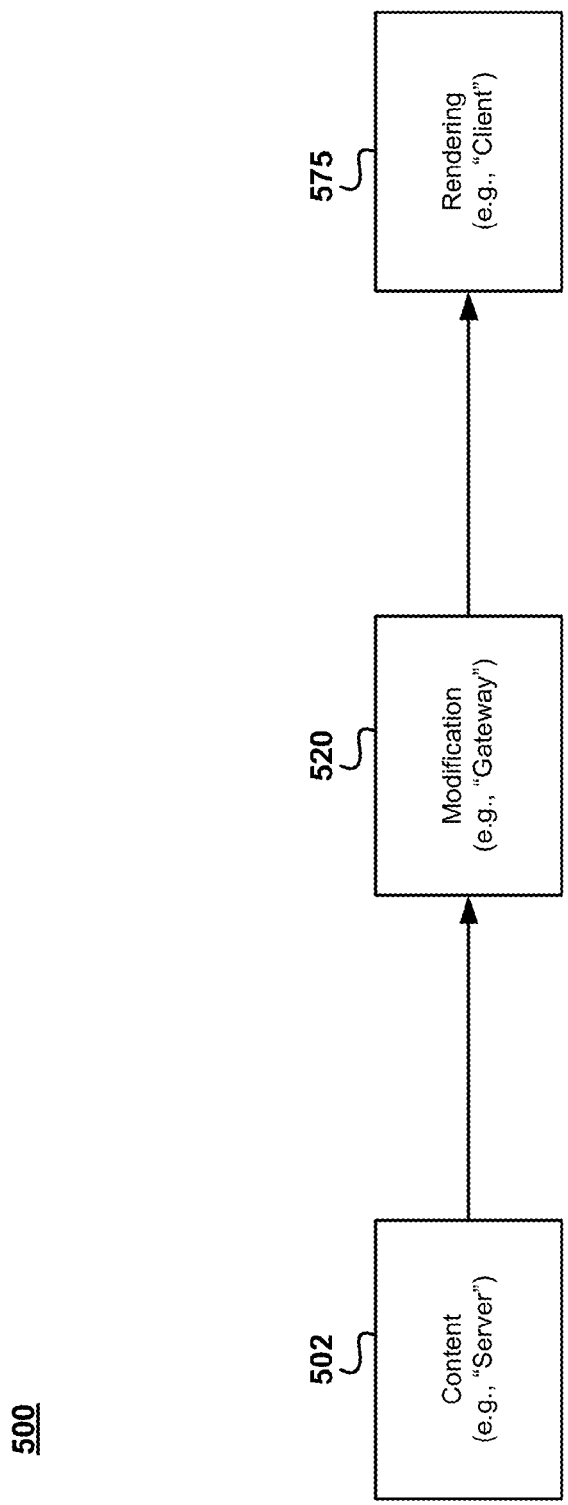
FIG. 5A illustrates the operation of a representative embodiment of the present invention in the form of a simplified "Three-Box Model."

FIG. 5A illustrates the operation of a representative embodiment of the present invention in the form of a simplified "Three-Box Model." The model illustrated in FIG. 5A includes an entity that acts as a source of media content 502 such as, for example, a web server, an entity that performs modification of the media content 520 such as, for example, a media gateway, and an entity that renders media content 575 such as, for example, a web browser application in a mobile device. The model of FIG. 5A may be implemented in a number of ways.

In one representative embodiment of the present invention, the entities that act as source of the media content, the modifier of the media content, and the renderer of the media content may be divided as illustrated in FIG. 5A, with a web server transmitting web page content to a media gateway that performs modification of the web page content, and that sends the modified web page content to a user mobile device having a web browser application which processes the receives and renders the web page content for viewing.

In another representative embodiment of the present invention, the entity that acts as source of the web page content may also act of the modifier of the web page content. In such an arrangement, a web server may modify web page content in the manner to be described below, before transmission to a browser application of a user mobile device for rendering and viewing.

In yet a third representative embodiment of the present invention, the entity which acts as source of the web page content may transmit the requested web page content to the user mobile device, which may modify the received web page content in the manner to be described below, before the modified web page content is rendered for viewing.

Figure 5B:
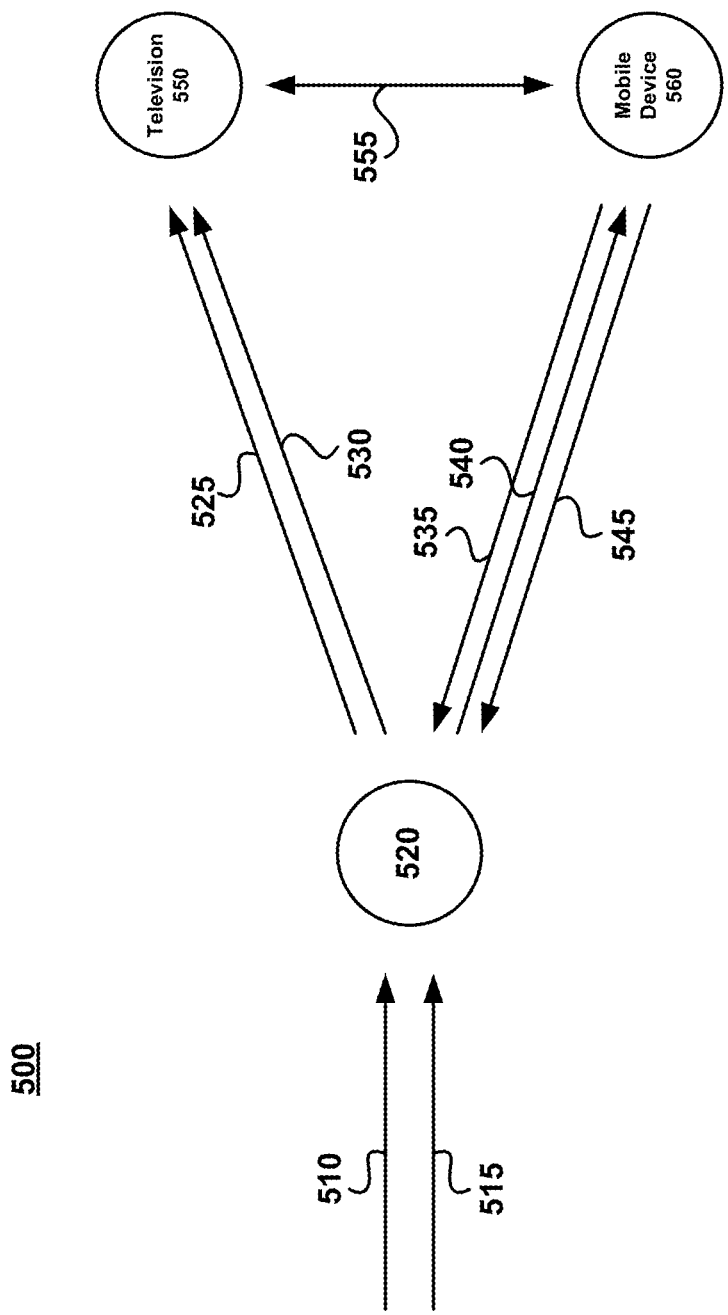
FIG. 5B shows a block diagram illustrating the flow of information in a simplified premise environment having a media gateway, a television, and a user mobile device, in accordance with a representative embodiment of the present invention.

FIG. 5B shows a block diagram illustrating the flow of information in a simplified premise environment 500 having a media gateway 520, a television 550, and a user mobile device 560, in accordance with a representative embodiment of the present invention. Following power-up or upon entering the premise environment 500, the user mobile device 560 performs topological discovery to ascertain which, if any, electronic devices are in the proximity of the user mobile device 560. The communication of identity and capability information collected by the user mobile device 560 while performing the topological discovery is represented in FIG. 5B as information flow 555. Following topological discovery, the user mobile device 560 shares the topological information gathered during topological discovery with the media gateway 520 via information flow 535. At some later time, the user uses a web browser to access a web page from a web server (not shown). The web server transmits the requested web page, represented in FIG. 5B by information flow 515, to the media gateway 520. Information flow 515 may be in the form of, for example, a stream of hypertext markup language (HTML) language constructs that define/describe the content of the graphical elements of the requested web page.

Upon receiving the information flow 515 that represents the web page requested by the user mobile device 560, the media gateway 520 processes the information flow 515 using the topological information received earlier from the user mobile device 560. If the information flow 515 representing the requested web page includes language constructs that support access to a stream of media content, the media gateway 520 examines the topological information received from the user mobile device 560 to ascertain whether any electronic devices suitable for display/playback/reproduction of the stream of media content were found in the proximity of the user mobile device 560 during the topological discovery process. If no electronic devices suitable for display/playback/reproduction of the stream of media content were found, the information flow 515 is passed to the user mobile device 560 unchanged.

If, however, electronic devices suitable for display/playback/reproduction of a stream of media content were located during the topological discovery, the media gateway 520 augments the web page content communicated as information flow 515, so that language constructs representing one or more additional graphical icons such as, for example, the icon 450 of FIG. 4B, are inserted appropriately into information flow 515. Each of the additional graphical icons for which information is inserted into information flow 515 represents an electronic device found during topological discovery that was deemed suitable for display/playback/reproduction of the stream of media content. The inserted information for each graphical icon is arranged so that selecting the graphical icon sends to the media gateway 520 a command that indicates that playback of the associated stream of media content was selected, and parameter(s) that identify the electronic device represented by the graphical icon selected. The augmented web page, which includes the information representing the additional graphical icons, is then transmitted by the media gateway 520 to the user mobile device 560 as information flow 540.

When the user mobile device 560 receives the augmented web page represented by information flow 540, a web browser in the user mobile device 560 renders the augmented web page content to the display of the user mobile device 560, displaying the original web page content represented by information flow 515, along with any additional graphical icons representing the electronic devices found during the discovery process that are suitable for display/playback/reproduction of the requested stream of media content. The user of the user mobile device 560 may then view the original web page content on the user mobile device 560, and select from any of the graphical elements or icons represented by information flow 540, including the additional graphical icons (e.g., icon 450 of FIG. 4B) that represent the electronic devices suitable for display/playback/reproduction of the stream of media content accessible via the web page.

If the user selects a graphical element or icon displayed on the screen of the user mobile device 560, the browser responds by sending to the media gateway 520 a command intended for the server (not shown) from which the web page represented by information flow 515 was sent. The media gateway 520, upon receiving the command, uses the command and any parameters, and the topological information previously received from the user mobile device 560, to determine whether the received command was a command sent in response to user selection of one of the graphical icons included in the information flow 540 by the media gateway 520. If the received command was not a command sent in response to user selection of one of the graphical icons included in the information flow 540 by the media gateway 520, the command and related parameters are forwarded to the server, and any media content sent to the media gateway 520 by the server is forwarded to the user mobile device 560 for rendering and display.

If, however, the media gateway 520 determines that the received command was sent in response to user selection of one of the graphical icons inserted into the information flow 540 by the media gateway 520, the media gateway 520 directs media content subsequently received from the server, such as the stream of media content 510 of FIG. 5B, to the electronic device that corresponds to the graphical icon selected by the user of the user mobile device 560. The media gateway 520 uses the command and any related parameters, and the topological information previously received from the user mobile device 560, to send command information represented by information flow 530, and the stream of media content represented by information flow 525, to the electronic device represented by the selected graphical icon. This communication employs the wireless communication path supported by the electronic device represented by the graphical icon selected by the user. In this manner, the user of the user mobile device 560 has employed a simple extension to a familiar graphical user interface (i.e., a web page) to direct the desired stream of media content that would normally be rendered on the user mobile device 560 so that it instead is rendered on one of the suitable electronic devices in the premise environment of the user mobile device 560.

It should be note that the above description applies to one representative embodiment of the present invention. Other representative embodiments of the present invention may support directing the stream of media content of information flow 510 to both the user mobile device 560 and one or more suitable electronic devices in the premise environment of user mobile device 560.

Figure 6A:
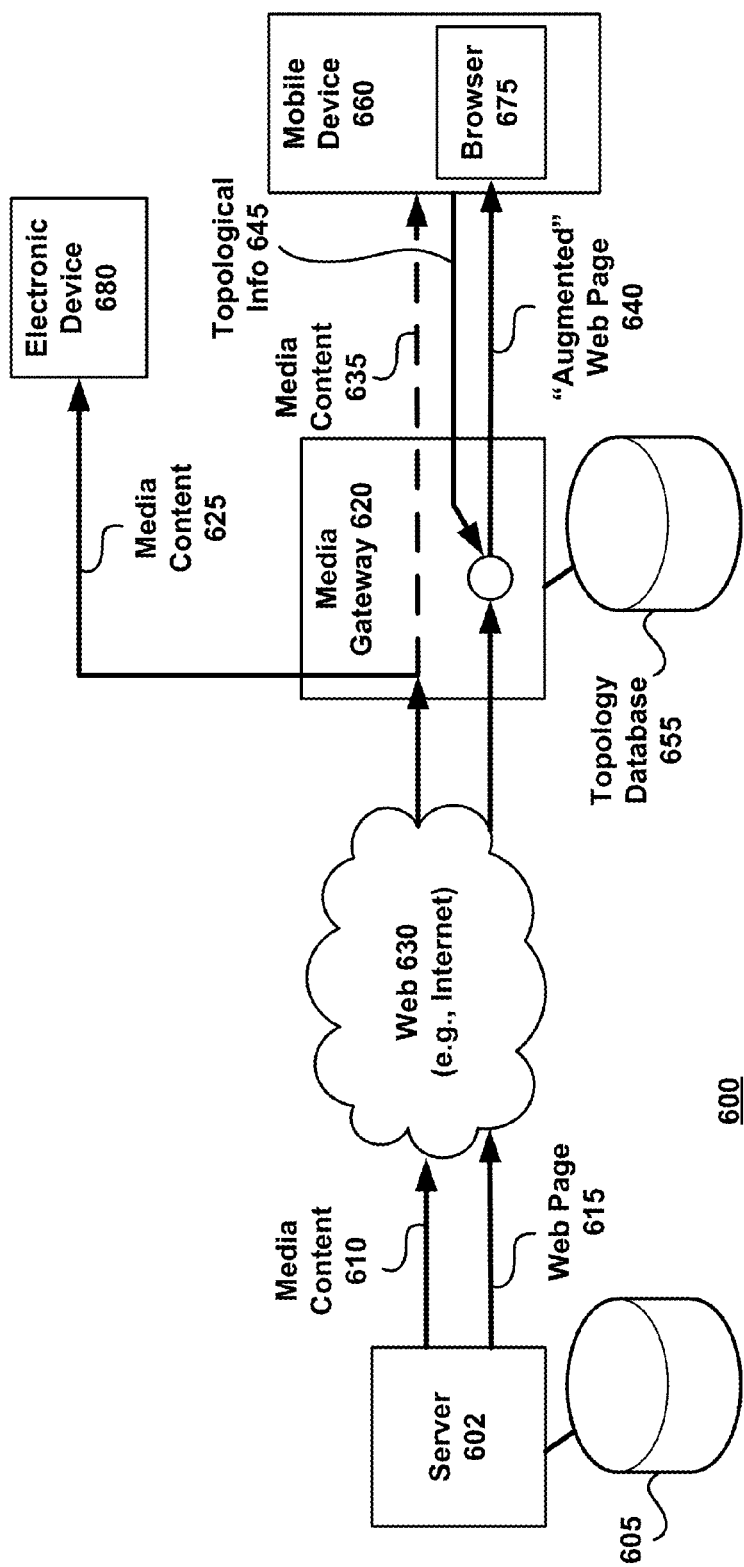
FIG. 6A is a block diagram illustrating the elements and information flow of an exemplary system in which a web page provided by a web server may be automatically augmented by a media gateway using topological information gathered by a user mobile device, in accordance with a representative embodiment of the present invention.

FIG. 6A is a block diagram illustrating the elements and information flow of an exemplary system 600 in which a web page 615 provided by a web server 602 may be automatically augmented by a media gateway 620 using topological information 645 gathered by a user mobile device 660, in accordance with a representative embodiment of the present invention. As illustrated in FIG. 6A, the system 600 comprises a Web server 602 with storage 605, a communication network represented as Web 630, a media gateway 620 having a topological database 655, and a user mobile device 660 with browser 675. The Web server 602 may be any suitable computer capable of running Web server software from any of a number of providers such as the open-source Apache web server software, for example, although other suitable web server software may also be used. The storage 605 may be used to store Web pages for distribution by the Web server 602, in addition to program code and data for operation of the Web server 602. The media gateway 620 may be, for example, any suitable residential gateway or personal computer equipped with software that provides functionality such as that described herein.

In a representative embodiment of the present invention, the user mobile device 660 may be any of a number of mobile/nomadic electronic devices such as, for example, a browser-equipped cellular telephone or smart phone, a wireless personal digital assistant, a wireless laptop, notebook, tablet, or netbook-type personal computer, or any other suitable electronic device capable of receiving and displaying/rendering web pages from the Web server 602. The system 600 illustrated in FIG. 6A also includes an electronic device 680 assumed for the purposes of this discussion to be capable of rendering media content from the Web server 602. Although not shown in FIG. 6A for reasons of clarity, the user mobile device 660 and the electronic device 680 are equipped with wireless communication circuitry to enable them to communicate with each other when in proximity to one another.

As described in greater detail above with respect to FIG. 5B, in a representative embodiment of the present invention, the user mobile device 660 may generate topological information 645 during topological discovery and mapping activities in a premise environment. In the representative embodiment of FIG. 6A, the user mobile device 660 may ascertain that the electronic device 680 shown in FIG. 6A is accessible to the user mobile device 660, and may collect identity and capability information from the electronic device 680, create topological information 645 about any electronic device(s) discovered in the proximity of the user mobile device (i.e., electronic device 680), and may then send the topological information 645 to the media gateway 620, which may store the topological information in a topology database 655.

At some time after the completion of the discovery process, a user of user mobile device 660 may employ the browser 675 to access a Web page 615 from Web server 602. Although referred to herein as a "Web server," the server 602 of a representative embodiment of the present invention is not specifically limited to function in that role, but instead may be part of any suitable communication network. The Web server 602 responds to the Web page access by the user of the user mobile device 660 by communicating content such as Web page 615, for example, to the user mobile device 660 via a communication network that may include, for example, the Internet (i.e., the Web 630) and the media gateway 620. The Web page 615 may be represented in a language such as, for example, HTML, and may contain language constructs that are rendered by browser 675 as selectable graphical icons representing additional content that may be accessed by user selection. The additional content available via the Web page 615 may include a selectable icon representing streaming media content, for example.

If upon receipt of the Web page 615 the media gateway 620 determines that Web page 615 contains language constructs for accessing, for example, streaming media content, the media gateway 620, in accordance with a representative embodiment of the present invention, may modify or augment the information representing Web page 615 by inserting additional language constructs representing additional graphical icons into the data representing the Web page 615. The media gateway 620 of a representative embodiment of the present invention automatically generates the language constructs appropriate to represent graphical icons for each of the electronic devices (e.g., electronic device 680) that are found to be in proximity and accessible to the user mobile device 660, and that are able to receive and render the media content for display/playback/reproduction. The media gateway 620 then modifies or "augments" the media content of the Web page 615 by inserting the generated information representing the additional graphical icons appropriately into the media content representing web page 615, to cause the additional graphical icons to appear in logical association with the related media content available for display/playback/reproduction when the modified/augmented Web page 640 is later rendered and displayed by the browser 675 of the user mobile device 660. The media gateway 620 then transmits the modified/augmented Web page 640 to the user mobile device 660 for rendering and display.

If the user selects a graphical element or icon displayed on the screen of the user mobile device 660, the browser 675 responds by sending to the media gateway 620 a command intended for the Web server 602 from which the Web page 615 was sent. The media gateway 620, upon receiving the command, uses the command and any parameters, and the topological information previously received from the user mobile device 660 and stored in the topology database 655, to determine whether the received command was a command sent in response to user selection of one of the graphical icons included in the modified/augmented Web page 640 by the media gateway 620. If the received command was not a command sent in response to user selection of one of the graphical icons included in the Web page 640 by the media gateway 620, the command and related parameters are forwarded to the Web server 602, and any media content sent to the media gateway 620 by the Web server 602 is forwarded to the user mobile device 660 for rendering and display by the browser 675.

If, however, the media gateway 620 determines that the received command was sent in response to user selection of one of the graphical icons inserted into the modified/augmented Web page 640 by the media gateway 620, the media gateway 620 directs media content subsequently received from the Web server 602 such as, for example, the media content 610 of FIG. 6A, to the electronic device that corresponds to the graphical icon selected by the user of the user mobile device 660, in this example, as media content 625 sent to the electronic device 680. The media gateway 620 uses the command and any related parameters, and the topological information previously received from the user mobile device 660 and stored in the topology database 655, to send command information, and the media content represented in FIG. 6A by information flow 625, to the electronic device 680, employing the wireless communication path supported by the electronic device 680. In this manner, the user of the user mobile device 660 is enabled to direct the desired media content to a suitable electronic device in the premise environment of the user mobile device 660, using an extension to a familiar web page interface. In addition, in accordance with a representative embodiment of the present invention, the media gateway 620 may produce media content suitable for rendering and display on the user mobile device 660, shown in FIG. 6A as the dashed line representing media content 635, to enable the user of the user mobile device 660 to view the same content on user mobile device 660, as that directed by the media gateway 620 for rendering and display on the electronic device 680.

Figure 6B:
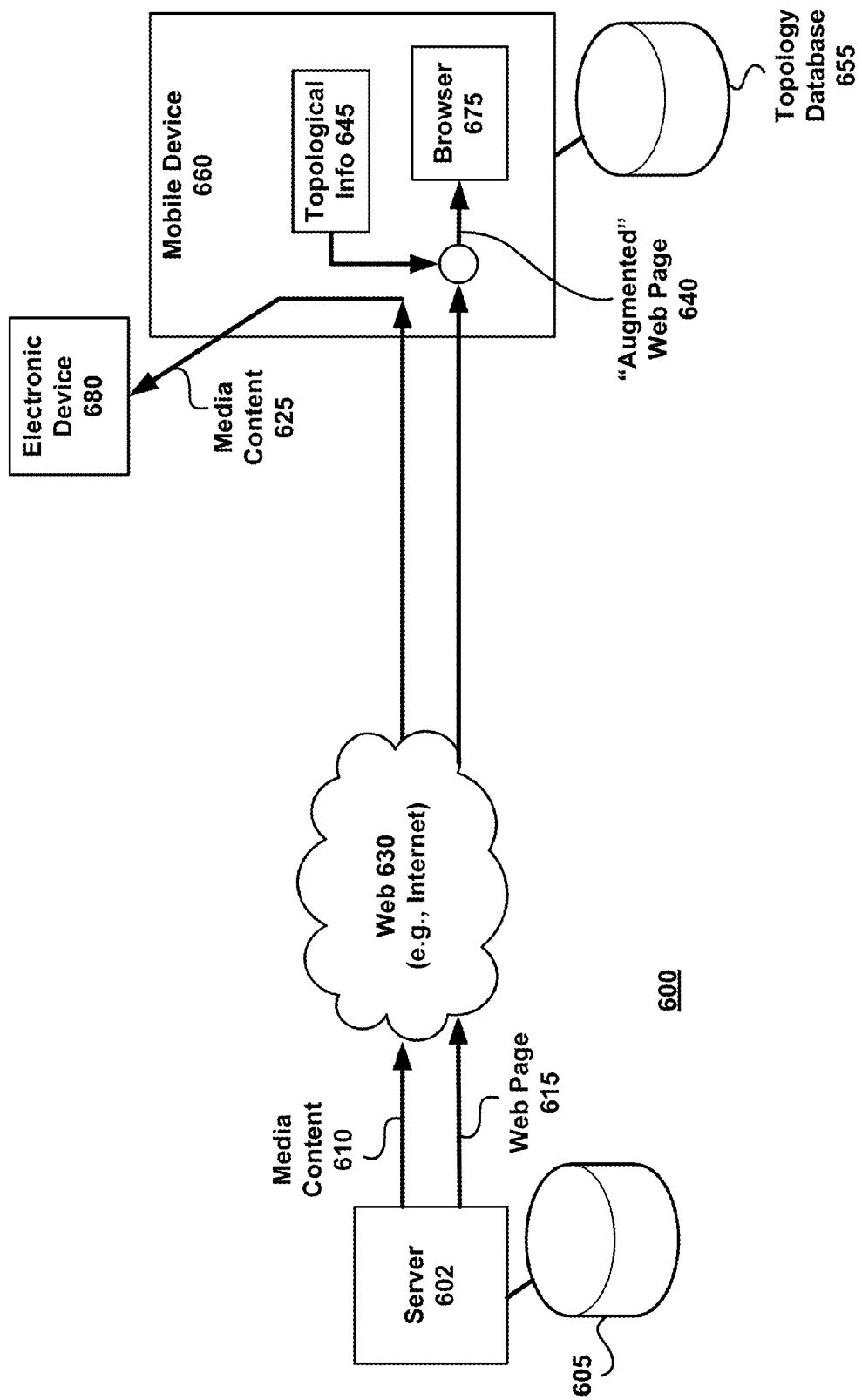
FIG. 6B is a block diagram illustrating the elements and information flow of an exemplary system in which a web page provided by a web server may be automatically augmented by a user mobile device using topological information gathered by the user mobile device, in accordance with another representative embodiment of the present invention.

FIG. 6B is a block diagram illustrating the elements and information flow of an exemplary system 600 in which a web page 615 provided by a web server 602 may be automatically augmented by a user mobile device 660 using topological information 645 gathered by the user mobile device 660, in accordance with another representative embodiment of the present invention. As illustrated in FIG. 6B, the system 600 comprises a Web server 602 with storage 605, a communication network represented as Web 630, and a user mobile device 660 with browser 675 and a topological database. The Web server 602 may be any suitable computer capable of running Web server software from any of a number of providers such as the open-source Apache web server software, for example, although other suitable web server software may also be used. The storage 605 may be used to store Web pages for distribution by the Web server 602, in addition to program code and data for operation of the Web server 602.

In a representative embodiment of the present invention, the user mobile device 660 may be any of a number of mobile/nomadic electronic devices such as, for example, a browser-equipped cellular telephone or smart phone, a wireless personal digital assistant, a wireless laptop, notebook, tablet, or netbook-type personal computer, or any other suitable electronic device capable of receiving and displaying/rendering web pages from the Web server 602. The system 600 illustrated in FIG. 6B also includes an electronic device 680 assumed for the purposes of this discussion to be capable of rendering media content from the Web server 602. As shown in FIG. 6B, the user mobile device 660 and the electronic device 680 are equipped with wireless communication circuitry to enable them to communicate with each other when in proximity to one another.

in a representative embodiment of the present invention, the user mobile device 660 may generate topological information 645 during topological discovery and mapping activities in a premise environment, which may be stored in a database contained in memory of the user mobile device 660, shown in FIG. 6B as topology database 655. In the representative embodiment of FIG. 6B, the user mobile device 660 may ascertain that the electronic device 680 shown in FIG. 6B is accessible to the user mobile device 660, and may collect identity and capability information from the electronic device 680, create topological information 645 about any electronic device(s) discovered in the proximity of the user mobile device (i.e., electronic device 680), and store the topological information in the topology database 655.

At some time after the completion of the discovery process, the user of user mobile device 660 may use the browser 675 to access a Web page 615 from Web server 602. The Web server 602 responds to the Web page access by the user of the user mobile device 660 by communicating content such as Web page 615, for example, to the user mobile device 660 via a communication network that may include, for example, the Internet (i.e., the Web 630). The Web page 615 may be represented in a markup language that supports hyperlinks to media content such as, for example, HTML, and may contain language constructs that are rendered by browser 675 as selectable graphical icons representing additional content that may be accessed by user selection. The additional content available via the Web page 615 may include a selectable icon representing streaming media content, for example.

Upon receipt of a Web page 615 that contains language constructs for accessing, for example, streaming media content, the user mobile device 660 of example of FIG. 6B, may modify or augment the information representing Web page 615 by inserting additional language constructs representing additional graphical icons. The user mobile device 660 of such a representative embodiment of the present invention automatically generates the language constructs appropriate to represent graphical icons for each of the electronic devices (e.g., electronic device 680) that are found to be in proximity and accessible to the user mobile device 660, and that are able to receive and render media content for display/playback/reproduction, such as the electronic device 680 of FIG. 6B. The user mobile device 660 then modifies or "augments" the media content of the Web page 615 by inserting the generated information representing the additional graphical icons appropriately into the media content representing web page 615 producing modified/augmented Web page 640, arranged to cause the additional graphical icons to appear in logical association with the related media content available for display/playback/reproduction when rendered by browser 675. The browser 675 then renders and displays the modified/augmented Web page 640 on the user mobile device 660.

If the user selects a graphical element or icon displayed on the screen of the user mobile device 660, software of the user mobile device 660 determines whether the selected graphical icon is one of the graphical icons inserted into the modified/augmented Web page 640 by the user mobile device 660. If the selected graphical icon was not one of the graphical icons added to the Web page 640 by the user mobile device 660, a command and related parameters used to access the desired media content are sent to the Web server 602 by the user mobile device 660. In response, the Web server 602 sends the requested media content to the user mobile device 660. The media content received by the user mobile device 660 is then is then rendered and displayed by the browser 675.

If, however, the user mobile device 660 determines that the selected graphical icon is one of the graphical icons inserted into the modified/augmented Web page 640 by the user mobile device 660, a command and related parameters used to access the desired media content are sent to the Web server 602 by the user mobile device 660, and the user mobile device 660 directs media content subsequently received from the Web server 602, such as the media content 610 of FIG. 6B, to the electronic device that corresponds to the graphical icon selected by the user of the user mobile device 660, in this example, as the media content 625 sent to the electronic device 680. The user mobile device 660 uses the command and any related parameters, and the topological information previously collected by the user mobile device 660 and stored in the topology database 655, to send command information, and media content represented in FIG. 6B by information flow 625, to the electronic device 680, employing the wireless communication path supported by the electronic device 680 and user mobile device 660. In this manner, the user of the user mobile device 660 is enabled to direct the desired media content to a suitable electronic device in the premise environment of the user mobile device 660, using a simple extension to a familiar web page interface.

Figure 6C:
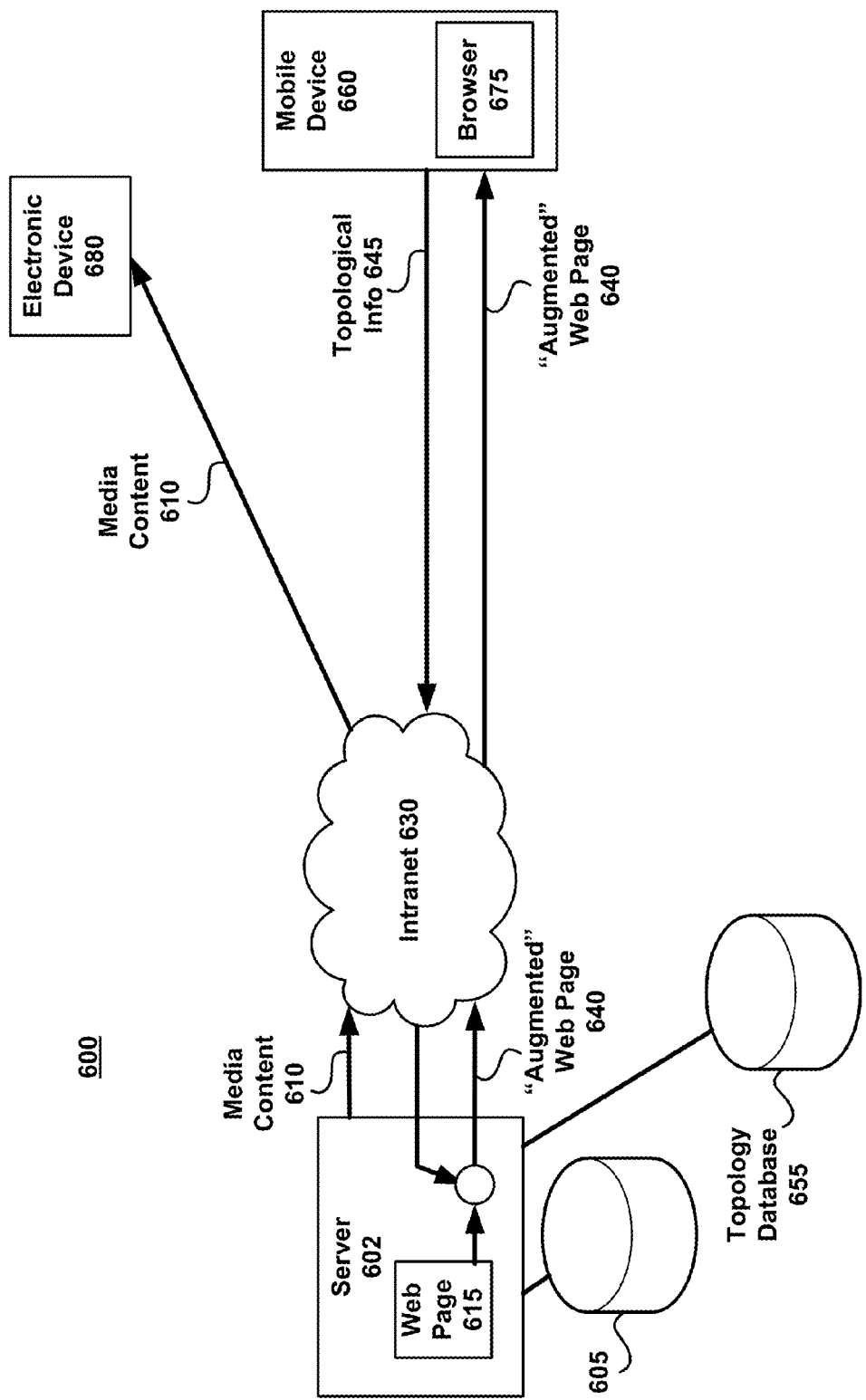
FIG. 6C is a block diagram illustrating the elements and information flow of an exemplary system in which a web page provided by a web server may be automatically augmented by a Web server using topological information gathered by a user mobile device, in accordance with yet another representative embodiment of the present invention.

FIG. 6C is a block diagram illustrating the elements and information flow of an exemplary system 600 in which a web page 615 provided by a web server 602 may be automatically augmented by a Web server 602 using topological information 645 gathered by a user mobile device 660, in accordance with yet another representative embodiment of the present invention. As illustrated in FIG. 6C, the system 600 comprises a Web server 602 with storage 605 and a topology database 655, a communication network represented as Intranet 630, and a user mobile device 660 with browser 675. The Web server 602 may be any suitable computer capable of running Web server software from any of a number of providers such as the open-source Apache web server software, for example, although other suitable web server software may also be used. The storage 605 may be used to store Web pages for distribution by the Web server 602, in addition to program code and data for operation of the Web server 602.

In a representative embodiment of the present invention, the user mobile device 660 may be any of a number of mobile/nomadic electronic devices such as, for example, a browser-equipped cellular telephone or smart phone, a wireless personal digital assistant, a wireless laptop, notebook, tablet, or netbook-type personal computer, or any other suitable electronic device capable of receiving and displaying/rendering web pages from the Web server 602. The system 600 illustrated in FIG. 6C also includes an electronic device 680 assumed for the purposes of this discussion to be capable of rendering media content from the Web server 602. Although not shown in FIG. 6C for reasons of clarity, the user mobile device 660 and the electronic device 680 are equipped with wireless communication circuitry to enable them to communicate with each other when in proximity to one another.

In the representative embodiment of FIG. 6C, the user mobile device 660 may ascertain that the electronic device 680 shown in FIG. 6C is accessible to the user mobile device 660, and may collect identity and capability information from the electronic device 680, create topological information 645 about any electronic device(s) (e.g., electronic device 680) discovered in the proximity of the user mobile device, and may send the topological information 645 to the Web server 602, which may store the topological information in the topology database 655.

Later, after completion of the discovery process, the user of user mobile device 660 may use the browser 675 to access a Web page 615 from Web server 602. The Web server 602 may respond to the Web page access by the user of the user mobile device 660 by accessing content such as Web page 615, for example, for the user mobile device 660. The Web page 615 may be represented in a markup language that supports hyperlinks to media content such as, for example, HTML, and may contain language constructs that will be rendered by browser 675 of user mobile device 660 as selectable graphical icons representing additional content that may be accessed by user selection. The additional content available via the Web page 615 may include a selectable icon representing streaming media content, for example.

If the Web server 602 determines that the Web page 615 contains language constructs for accessing, for example, streaming media content, the Web server 602, operating in accordance with a representative embodiment of the present invention, modifies or augments the information representing Web page 615 by inserting additional language constructs representing additional graphical icons. The Web server 602 of a representative embodiment of the present invention automatically generates the language constructs appropriate to represent graphical icons for each of the electronic devices (e.g., electronic device 680) that are found to be in proximity and accessible to the user mobile device 660, and that are able to receive and render the media content for display/playback/reproduction, as indicated by the information stored in the topology database 655. The Web server 602 then modifies or "augments" the media content of the Web page 615 by inserting the generated information representing the additional graphical icons appropriately into the media content representing web page 615, to cause the additional graphical icons to appear in logical association with the related media content available for display/playback/reproduction when rendered and displayed by the browser 675 of user mobile device 660. The Web server 602 then transmits the modified/augmented Web page 640 to the user mobile device 660 for rendering and display by the browser 675.

If the user selects a graphical element or icon displayed on the screen of the user mobile device 660, the browser 675 responds by sending a command and related parameters to the Web server 602 from which the Web page 615 was sent. The Web server 602, upon receiving the command, uses the command and related parameters, and the topological information previously received from the user mobile device 660 and stored in the topology database 655 to determine whether the received command is a command sent in response to user selection of one of the graphical icons inserted into the modified/augmented Web page 640 by the Web server 602. If the received command was not sent in response to user selection of one of the graphical icons included in the Web page 640 by the Web server 602, the requested media content is sent to the user mobile device 660 by the Web server 602 for rendering and display by the browser 675.

If, however, the Web server 602 determines that the received command was sent in response to user selection of one of the graphical icons inserted into the modified/augmented Web page 640 by the Web server 602, the Web server 602 causes the media content to be delivered to the electronic device 680. In one representative embodiment of the present invention, the Web server 602 may send the media content 610 to the electronic device 680, as shown in FIG. 6C by addressing the packets containing streaming media content to the electronic device 680, using the information in topology database 655. In this manner, the user of the user mobile device 660 is enabled to direct the desired media content to a suitable electronic device in the premise environment of the user mobile device 660, using a simple extension to a familiar web page interface.

Figure 7A:
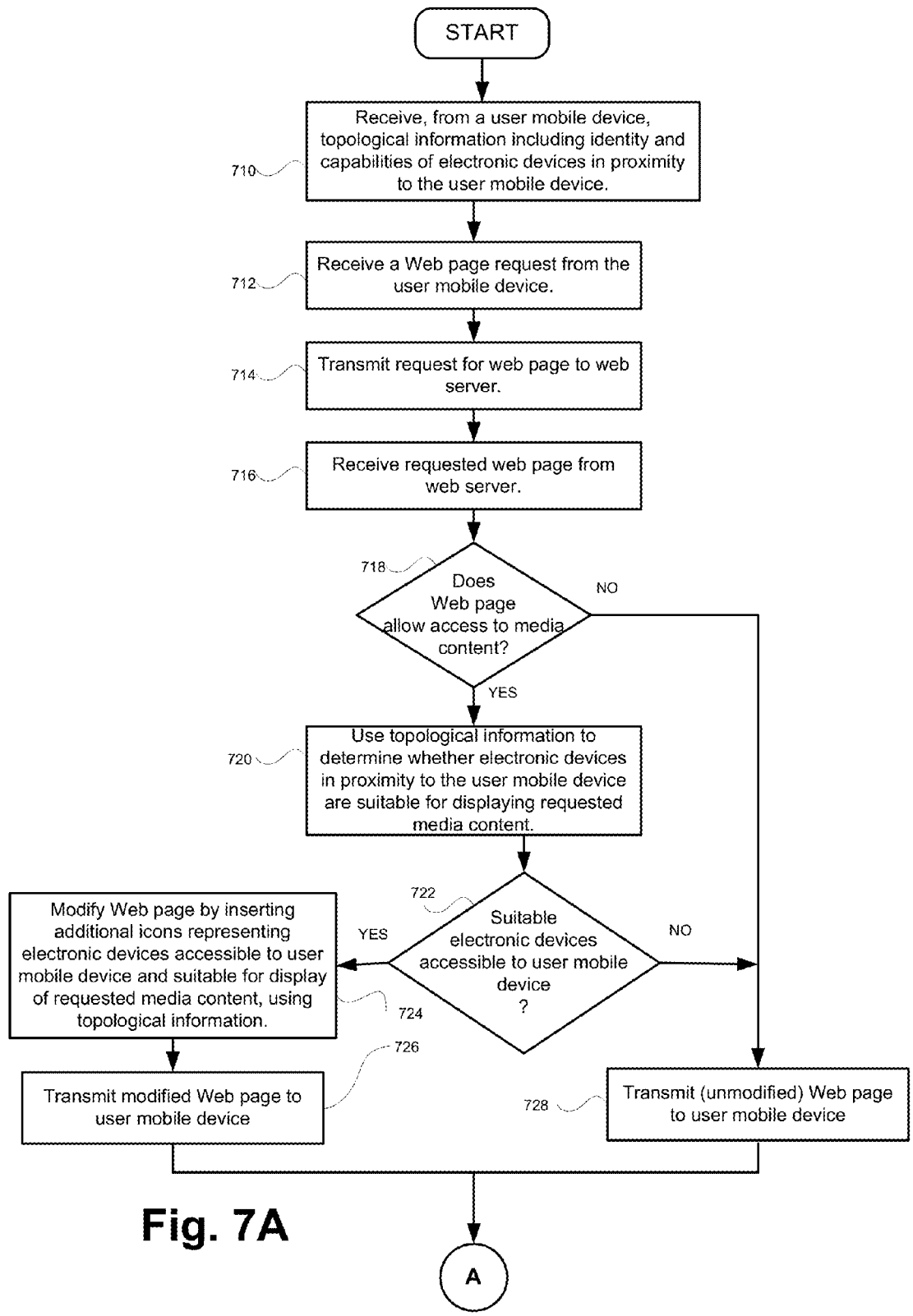
FIGS. 7A-7B illustrate a flowchart of an exemplary method of operating a media gateway supporting in-house location based services, in accordance with a representative embodiment of the present invention.
Figure 7B:
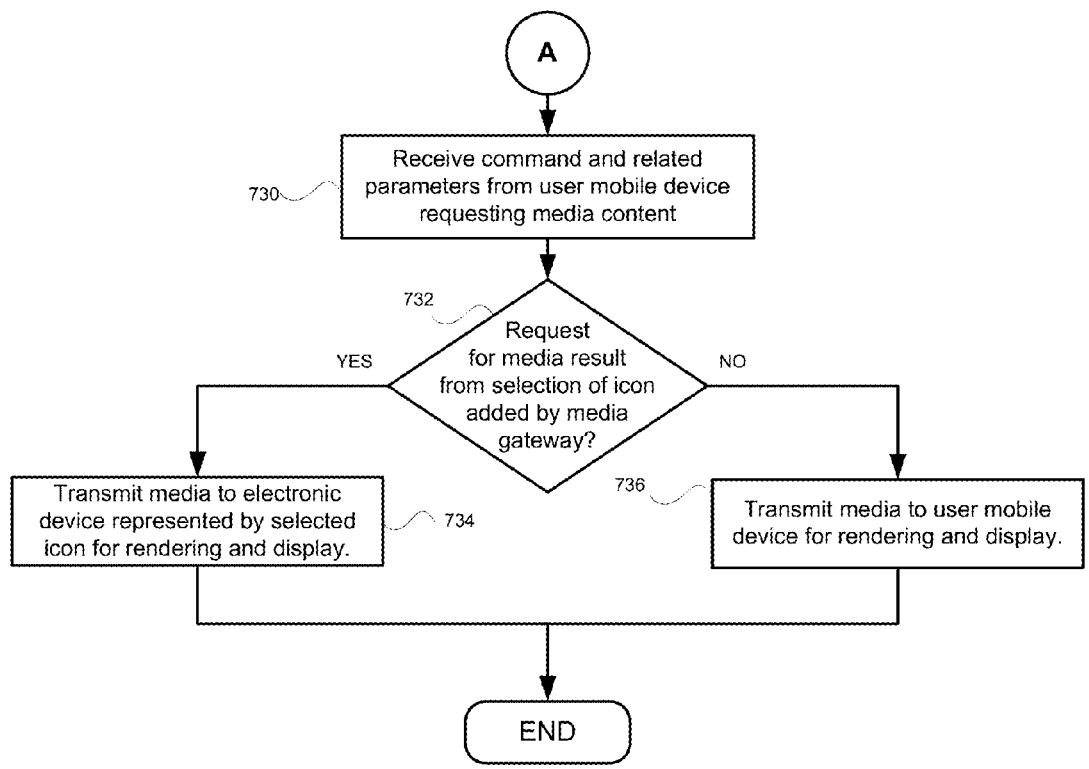

FIGS. 7A-7B illustrate a flowchart of an exemplary method of operating a media gateway supporting in-house location based services, in accordance with a representative embodiment of the present invention. The following discussion of the method of FIGS. 7A-7B makes reference to the elements of FIG. 6A.

The method of FIG. 7A begins following power-up of a media gateway such as the media gateway 620 of FIG. 6A. At some point in time thereafter, a user mobile device such as the user mobile device 660 of FIG. 6A enters into a premise environment served by the media gateway at block 710, and performs discovery to determine what, if any, electronic devices are in proximity of the user mobile device 660. In a representative embodiment of the present invention, discovery by the user mobile device 660 may be a continuing process that identifies at any point in time what electronic devices are in proximity to and accessible by the user mobile device 660. At some time after the completion of discovery, such as at the time the user mobile device detects the presence of the media gateway 620, and/or periodically thereafter, the user mobile device 660 shares topological information collected by the user mobile device 660 with the media gateway 620.

Beginning now, at block 710, the media gateway 620 receives topological information collected by the user mobile device 660. The collected topological information includes identity and capability information of any electronic devices in proximity to the user mobile device 660. The media gateway 620 may store the received topological information in a database such as topology database 655. At some later time, at block 712, the media gateway 620 receives a Web page request from the user mobile device 660. The media gateway 620 then, at block 714, transmits the received Web page request to the Web server 602, and shortly thereafter receives the requested Web page, at block 716. In accordance with a representative embodiment of the present invention, the received Web page may be described in terms of constructs of, for example, the hypertext markup language (HTML) or any markup language supporting hyperlinks to media content.

Next, at block 718, the media gateway 620 determines whether the received Web page includes language constructs to access media content. If not, the method of FIG. 7A proceeds to block 728, where the media gateway 620 transmits the received Web page to the user mobile device 660, and transitions to block 730 of FIG. 7B, described below. If, however, the received Web page is found to contain language constructs to access media content, the method moves to block 720, where the media gateway 620 uses the topological information received from the user mobile device 660 to determine whether any electronic devices in proximity to the user mobile device 660 are suitable for displaying the requested media content. If, at block 722, the media gateway 620 determines that electronic devices suitable for displaying the requested media content are not accessible to the user mobile device 660, the method of FIG. 7A transitions to block 728, where the media gateway 620 transmits the received Web page to the user mobile device 660. The method of FIG. 7A then transitions to block 730 of FIG. 7B, described below.

If, however, at block 722, the method of FIG. 7A determines that electronic devices suitable for displaying the requested media content are accessible to the user mobile device 660, the method moves to block 724, where the media gateway 620 uses the topological information to modify the received Web page by inserting language constructs that will be rendered and displayed by the browser 675 of user mobile device 660 as additional graphical icons. The additional icons added to the received Web page for display by the user mobile device 660 represent the electronic devices accessible to the user mobile device 660 that are suitable for displaying the media content accessible through the received Web page. The method of FIG. 7A then, at block 726, transmits the modified Web page, which includes the language constructs to display the additional graphical icons, to the user mobile device 660 for rendering and display. The method then transitions to clock 730 of FIG. 7B.

The method proceeds at block 730 when the media gateway 620 receives from the user mobile device 660 a command and related parameters requesting media content. The method of FIG. 7B then, at block 732, determines whether the request for media content resulted from user selection of an icon added by the media gateway 620. If the request for media content received from the user mobile device 660 was the result of user selection of an icon added to the Web page by the media gateway 620, the method of FIG. 7B, at block 734, transmits the requested media content to the electronic device represented by the selected icon, so that it can be rendered and displayed on the selected electronic device. If, however, the media gateway determines, at block 732, that the request for a media did not result from selection of an icon added by the media gateway 620, the media gateway of the method of FIG. 7B, at block 736, transmits the media content to the user mobile device 660, for rendering and display by the browser 675.

Aspects of the present invention may be seen in a method of operating a media gateway supporting location based services. Such a method may comprise receiving, from a mobile device of a user, topological information identifying one or more electronic devices in a premise environment, and receiving, from the mobile device for transmission to a server, a message identifying content for delivery by the server to the mobile device. The method may receive, from the server, the content identified in the message, determine whether the received content contains information identifying user selectable media content, and modify the content received from the server to cause display at the mobile device of one or more graphical objects representing electronic devices in the premise environment capable of reproducing the selectable media content.

A representative embodiment of the present invention may transmit the modified content to the mobile device for display, receive, from the mobile device, an indication of user selection of a graphical object representing one of the one or more electronic devices capable of reproducing the media content, and send to the server a requesting for delivery of the media content to the media gateway. Such a representative embodiment may also direct received media content to the one of the one or more electronic devices corresponding to the selected graphical object.

In various representative embodiments of the present invention, the content may comprise content of a web page, and may comprise elements of a markup language that supports hyperlinks to media content. In some representative embodiments of the present invention, the markup language may comprise hypertext markup language (HTML). The mobile device of the user may be one of a cellular telephone, a smart phone, and a portable personal computer, and may comprise a tablet computer. The topological information may comprise identity and capability information for each of the one or more electronic devices, and may comprise information representing arrangement and connectivity of the one or more electronic devices. The topological information may be determined by the mobile device using wireless communication with electronic devices within a certain proximity of the mobile device. In a representative embodiment of the present invention, the modifying may comprise augmenting the received content with additional information representing one or more selectable graphical objects for rendering and display at the mobile device, where the one or more graphical objects corresponding to those of the one or more electronic devices that are capable of reproducing media content.

Additional aspects of the present invention may be found in a system for use in a media gateway supporting location based services. Such a system may comprise at least one processor arranged to communicatively couple to a server and to a mobile device of a user. The at least one processor, during operation, may receive, from the mobile device, topological information identifying one or more electronic devices in a premise environment, and receive, from the mobile device for transmission to the server, a message identifying content for delivery by the server to the mobile device. The at least one processor may also receive, from the server, the content identified in the message, determine whether the received content contains information identifying user selectable media content, and modify the content received from the server to cause display at the mobile device of one or more graphical objects representing electronic devices in the premise environment capable of reproducing the selectable media content.

The at least one processor of a representative embodiment may transmit the modified content to the mobile device for display, and receive, from the mobile device, an indication of user selection of a graphical object representing one of the one or more electronic devices capable of reproducing the media content. The at least one processor may send to the server a requesting for delivery of the media content to the media gateway, and direct received media content to the one of the one or more electronic devices corresponding to the selected graphical object.

In various representative embodiments of the present invention, the content may comprise content of a web page, and may comprise elements of a markup language that supports hyperlinks to media content In some representative embodiments of the present invention, the markup language may comprise hypertext markup language (HTML). The mobile device of the user may be one of a cellular telephone, a smart phone, and a portable personal computer, and may comprise a tablet computer.

The topological information may comprise identity and capability information for each of the one or more electronic devices, and may comprise information representing arrangement and connectivity of the one or more electronic devices. The topological information may be determined by the mobile device using wireless communication with electronic devices within a certain proximity of the mobile device.

The modifying may comprise augmenting the received content with additional information representing one or more selectable graphical objects for rendering and display at the mobile device, the one or more graphical objects corresponding to those of the one or more electronic devices that are capable of reproducing media content.

Yet another representative embodiment of the present invention may be observed in a non-transitory computer-readable medium having stored thereon a plurality of code sections, each code section comprising a plurality of executable instructions for a processor. The instructions may cause the processor to perform the operations comprising receiving, from a mobile device of a user, topological information identifying one or more electronic devices in a premise environment, and receiving, from the mobile device for transmission to a server, a message identifying content for delivery by the server to the mobile device. The instructions may also cause the processor to receive, from the server, the content identified in the message, determine whether the received content contains information identifying user selectable media content, and modify the content received from the server to cause display at the mobile device of one or more graphical objects representing electronic devices in the premise environment capable of reproducing the selectable media content.

In a representative embodiment of the present invention, the instructions may cause the processor to transmit the modified content to the mobile device for display, receive, from the mobile device, an indication of user selection of a graphical object representing one of the one or more electronic devices capable of reproducing the media content, and send to the server a requesting for delivery of the media content to the media gateway. In addition, the instructions may cause the processor to direct received media content to the one of the one or more electronic devices corresponding to the selected graphical object. The content may comprise content of a web page, and may comprise elements of a markup language that supports hyperlinks to media content. In some representative embodiments of the present invention, the markup language may comprise hypertext markup language (HTML). The mobile device of the user may be one of a cellular telephone, a smart phone, and a portable personal computer, and may comprise a tablet computer.

In various representative embodiments of the present invention, the topological information may comprise identity and capability information for each of the one or more electronic devices, and may comprise information representing arrangement and connectivity of the one or more electronic devices. The topological information may be determined by the mobile device using wireless communication with electronic devices within a certain proximity of the mobile device. The modifying may comprise augmenting the received content with additional information representing one or more selectable graphical objects for rendering and display at the mobile device, the one or more graphical objects corresponding to those of the one or more electronic devices that are capable of reproducing media content;

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   receiving, by a media gateway, a request for content from a mobile device, wherein the request comprises at least information identifying at least one electronic device in a premise environment;
   accessing, by the media gateway, the content identified in the request;
   modifying, by the media gateway, the content to include at least one graphical object representing the at least one electronic device in the premise environment;
   transmitting, by the media gateway, the modified content to the mobile device for display;
   receiving, by the media gateway, an indication of a selection of the at least one graphical object from the mobile device, the at least one graphical object representing the at least one electronic device capable of displaying the content;
   directing, by the media gateway, the content to the at least one electronic device corresponding to the selection of the at least one graphical object.

2. The method of claim 1, wherein the content comprises a network page.

3. The method of claim 1, wherein the content comprises elements of a markup language that supports hyperlinks to media content.

4. The method of claim 3, wherein the markup language comprises hypertext markup language (HTML).

5. The method of claim 1, wherein the mobile device is selected from a group consisting of a cellular telephone, a smart phone, a portable personal computer, and a tablet computer.

6. The method of claim 1, wherein the information comprises identity and capability information for the at least one electronic device.

7. The method of claim 1, wherein the information is determined by the mobile device using wireless communication with the at least one electronic device within a certain proximity of the mobile device.

8. The method of claim 1, wherein modifying, by the media gateway, the content further comprises augmenting the content with additional information representing at least one selectable graphical object for display at the mobile device, the at least one selected graphic object corresponding to the at least one electronic device if capable of reproducing media content.

9. A system comprising:
   a media gateway comprising at least one processor, wherein the media gateway is configured to:
      access content identified in a request for the content received from a mobile device;
      supplement the content to include at a plurality of graphical objects, each of the plurality of graphical objects corresponding to at least one of a plurality of electronic devices in a premise environment identified via information obtained by the mobile device;
      transmit the supplemented content to the mobile device for display;
      receive a selection of a selected one of the plurality of graphical objects from the mobile device; and
      transmit the content to the selected one of the plurality of electronic devices corresponding to the selection for display if the selected one of the plurality of electronic devices is capable of rendering the content.

10. The system of claim 9, wherein the media gateway if further configured to determine whether the content comprises language constructs associated with media content.

11. The system of claim 10, wherein the media gateway if further configured to determine whether at least one of the plurality of electronic devices is capable of rendering the media content.

12. The system of claim 9, wherein the content comprises content of a network page.

13. The system of claim 9, wherein the information further comprises topological information having identity and capability information for each of the plurality of electronic devices.

14. The system of claim 13, wherein the topological information further comprises information representing arrangement and connectivity of at least a portion of the plurality of electronic devices.

15. The system of claim 13, wherein the topological information is determined by the mobile device using wireless communication with the plurality of electronic devices within a certain proximity of the mobile device.

16. A non-transitory computer-readable medium embodying a program executable in at least one computing device, comprising code that:
   accesses network page content identified in a request for the network page content received from a mobile device;
   supplements the network page content to include at a plurality of graphical objects, each of the plurality of graphical objects corresponding to at least one of a plurality of electronic devices in a premise environment identified in topological information obtained via the mobile device;
   transmits the supplemented network page content to the mobile device for display;
   receive a selection of a selected one of the plurality of graphical objects from the mobile device; and
   transmits at least a portion of the network page to the selected one of the plurality of electronic devices corresponding to the selection for display if the selected one of the plurality of electronic devices is capable of rendering the content.

17. The non-transitory computer-readable medium of claim 16, wherein the network page content further comprises elements of a markup language that supports hyperlinks to media content.

18. The non-transitory computer-readable medium of claim 17, wherein the markup language further comprises hypertext markup language (HTML).

19. The non-transitory computer-readable medium of claim 16, wherein the mobile device is selected from a group consisting of a cellular telephone, a smart phone, a portable personal computer, and a tablet computer.

20. The non-transitory computer-readable medium of claim 16, wherein the topological information further comprises identity and capability information for each of the one or more electronic devices.

* * * * *